United States Patent [19]
Clarke et al.

[11] Patent Number: 5,956,163
[45] Date of Patent: Sep. 21, 1999

[54] IMAGE SENSOR

[75] Inventors: John A. Clarke, Carshalton; Arthur J. Jenkins, Reigate; Neil C. Bird, Horley, all of United Kingdom

[73] Assignee: U.S. Philips Corporation, New York, N.Y.

[21] Appl. No.: 08/923,127

[22] Filed: Sep. 4, 1997

[30] Foreign Application Priority Data

Sep. 7, 1996 [GB] United Kingdom .................. 9618719
Apr. 21, 1997 [GB] United Kingdom .................. 9708020

[51] Int. Cl.⁶ ......................................................... H04N 1/46
[52] U.S. Cl. ............................................. 358/509; 359/621
[58] Field of Search ................................... 358/505, 509, 358/511; 359/621, 622; 382/124, 127; 355/38

[56] References Cited

U.S. PATENT DOCUMENTS

| | | | |
|---|---|---|---|
| 5,053,808 | 10/1991 | Takagi ........................................ | 355/38 |
| 5,648,874 | 7/1997 | Sawaki et al. ........................... | 359/622 |
| 5,768,023 | 6/1998 | Sawaki et al. ........................... | 359/622 |
| 5,796,858 | 8/1998 | Zhou et al. ............................... | 382/127 |

FOREIGN PATENT DOCUMENTS 59-28756  2/1984  Japan .............................. H04N 1/028

OTHER PUBLICATIONS

"Microlens Arrays", by Mike Hutley et al, Physics World, Jul. 1991; pp. 27–32.

*Primary Examiner*—Joseph Mancuso
*Assistant Examiner*—Vikkram Bali
*Attorney, Agent, or Firm*—Anne E. Barschall

[57] ABSTRACT

An image sensor comprises an image capturing device 10 and a lens arrangement 20, 30, 40, positioned between an area to be imaged and the image capturing device 10. The lens arrangement includes at least one array 40 of spaced lens elements 42 for transmitting light from a portion of the area to be imaged to a portion of the device 10. Light emitting apparatus 46, for example electroluminescent strips, are disposed in or over the spacing between the lens elements 42. This provides a compact optical focusing and illumination system. A color imaging system may be provided using discrete colored light sources.

13 Claims, 6 Drawing Sheets

IMAGE SENSOR

BACKGROUND AND SUMMARY OF THE INVENTION

This invention relates to an image sensor, for example for use in a facsimile machine or document scanner, and more particularly in which a light source for illuminating an image to be sensed is integrated into the structure of the image sensor.

Conventionally, an image scanner or facsimile machine comprises a light source, an image sensor array and an optical system for forming an image of an original on the image sensor. To reduce the overall size of these components it is also known to incorporate an electroluminescent light emitting element and a close contact image sensor as a single unit.

For example, JP-59-028756 discloses an optical sensor in which a light emitting plate is attached to one side of a substrate, and a photodetecting element is attached to the other side of the substrate. The light emitting plate has openings aligned with the photodetecting elements, enabling the passage of light to the detecting elements after reflection by the document to be imaged. This system suffers from the drawback that the optical arrangement does not provide a significant depth of focus for the document to be imaged, and fibre plates incorporated into the substrate and associated with each detecting element increase the cost of the optical sensor arrangement.

According to the present invention, there is provided an image sensor comprising an image capturing device for capturing an image on an imaging plane of the device, and a lens arrangement, the lens arrangement being positioned between an area to be imaged and the imaging plane, the lens arrangement comprising one or more arrays of spaced apart lens elements each for transmitting light from a portion of the area to be imaged to a portion of the imaging plane, the image sensor further comprising light emitting means disposed between the area to be imaged and the imaging plane and for illuminating the area to be imaged, the light emitting means being disposed in or over the spacing between the lens elements.

The use of a lens arrangement enables focusing of the area to be imaged, so that a document to be scanned may be positioned within a selected range, corresponding to the depth of focus of the lens arrangement. Positioning the light emitting means between the lens elements, or over the spacing between the lens elements, enables a compact arrangement for the complete optical system.

Preferably, the lens elements are microlenses, and there may be provided more than one microlens array, arranged so that each microlens in one array is on the same optical axis as a corresponding microlens in each other array. The lens arrangement preferably transmits a non-inverted image of the area to be imaged to the imaging plane.

Preferably, a sufficient distance is provided between the lens arrangement and the area to be imaged, to enable spreading of the light produced by the light emitting means before illumination of the area to be imaged.

The image capturing device preferably comprises a plurality of image sensing pixels, and each lens element is associated with a sub-array of one or more pixels. Preferably, each lens element is associated with a plurality of pixels.

The range of angles from which light can be received by each lens element will dictate the possible spacing between lens elements, and this spacing is arranged to be sufficient to enable an appropriate light emitting means to be designed.

The light emitting means may comprise discrete light emitting portions in or over the spacing between the lens elements. It is preferable for sufficient illumination of the area to be imaged to be possible from a proportion of the light emitting portions. Preferably, each light emitting portion is then selected from the group comprising red, green and blue light sources. The light emitting portions may comprise strips of electroluminescent light emitting material extending between the lens elements of one array. The strips may be arranged in a repeating sequence of the three colours. This enables the area to be imaged to be illuminated with a selected colour by activating the appropriate light emitting strips, and the spreading within the space between the lens arrangement and the area to be imaged enables a uniformly illuminated colour image to be recorded.

Alteratively, the light emitting means may comprise a light source arranged at a peripheral edge of the lens arrangement, and light deflecting portions arranged in or over the spacing between lens elements. The light deflecting portions may then comprise reflecting or diffracting elements.

BRIEF DESCRIPTION OF THE DRAWINGS

The invention will now be described by way of example, with reference to the accompanying drawings, in which.

DETAILED DESCRIPTION OF THE INVENTION

Figure 1:
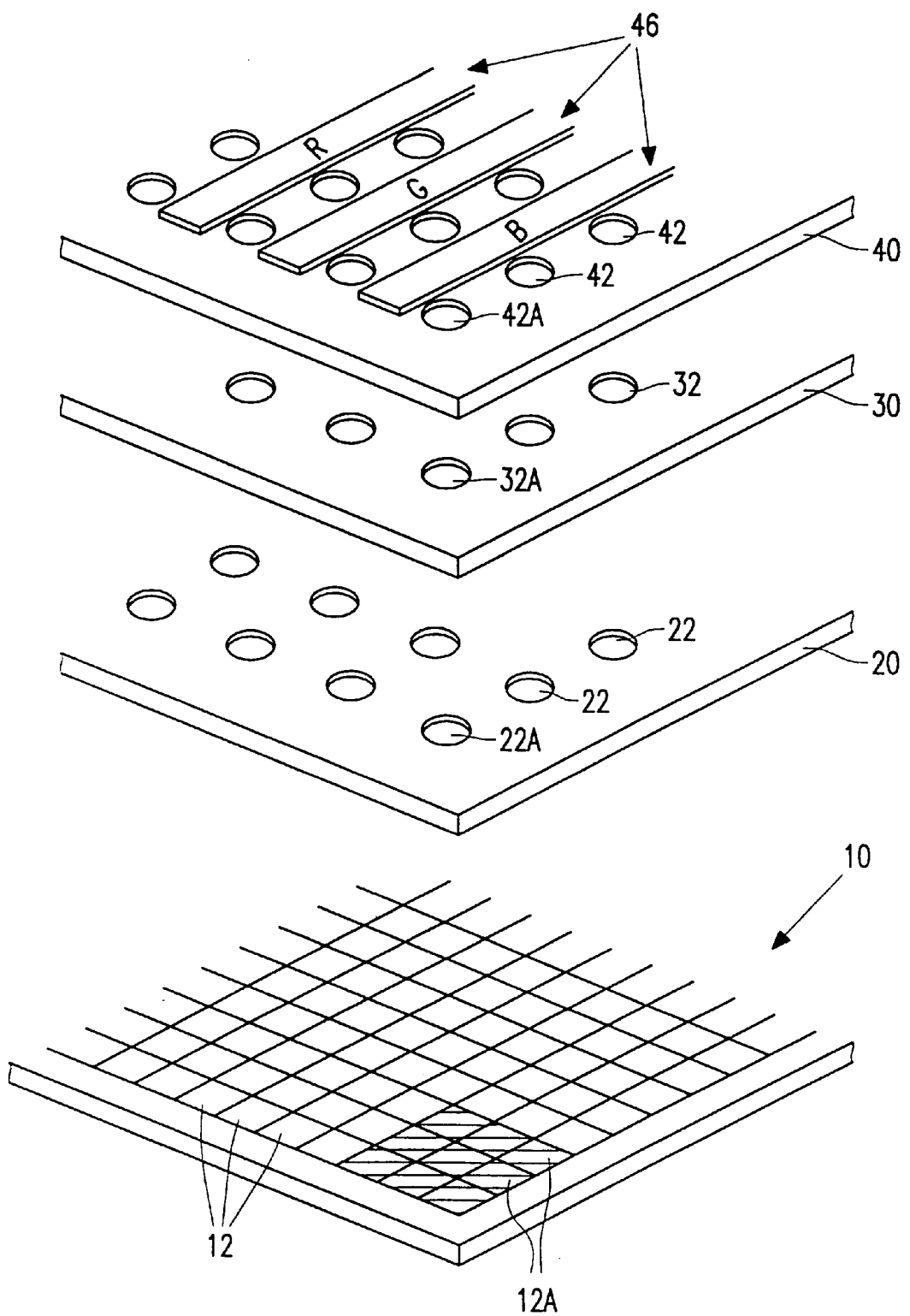
FIG. 1 shows a schematic exploded view of one possible image sensor in accordance with the invention.

FIG. 1 shows one example of an image sensor according to the invention, comprising a two dimensional image sensing array 10 having an array of pixels 12. The image sensor further comprises three lens arrays 20, 30, 40 which together focus an image on to the image sensing array 10. The lens array 40 nearest the area to be imaged includes light emitting portions 46 disposed between lens elements 42 of the lens array 40. The invention provides a compact optical system for focusing and for illumination of a document to be imaged.

The image sensing array 10 shown in FIG. 1 comprises a two dimensional array of pixels 12. The image sensing array 10 may be of known configuration and may, for example, comprise a substrate on to which thin film semiconductor layers are deposited in appropriate patterns to define an array of pixels 12. Each pixel preferably includes a photodiode, and various photodiode pixel arrangements will be known to those skilled in the art. Generally, an image sensing pixel comprises a photodiode in series with a switching element, for example a diode or a transistor.

Alternatively, the image sensing array 10 may form part of an electrostatic imaging system, as commonly used in photocopiers.

The image sensing array 10 may, as a further alternative, comprise an array of charge coupled devices (CCDs) which are also conventionally used in facsimile machines and electronic cameras.

Any of the above image sensing arrangements may be used, and for the purpose of the invention, the image sensing array 10 may be considered simply to represent a surface on to which the image to be recorded must be focused.

Focusing is provided by the three lens arrays 20, 30, 40 which each comprise an array of converging lens elements 22, 32, 42, arranged so that lenses in each array are on the same optical axis as a corresponding lens in each other array.

Each lens array may comprise a microlens array. Such arrays are known, and the microlens array used in the present invention may be formed by known techniques. The precise technique to be adopted will depend upon the size of the microlens elements required.

If a microlens element is to be associated with each pixel, very small microlenses are required. In such a case, it is known to form shaped lens elements of diameter as low as 50 μm from reformed thermoplastic resin. For this purpose, a substrate of the array 40 (usually glass) is coated with a thermoplastic resin layer, which may be applied by means of spin coating. Subsequent patterning of the thermoplastic resin may be carried out by means of photolithography. This gives a thermoplastic resin layer having discrete portions, each corresponding to an individual microlens 42, in the desired positions. Thermal reflow of the resin layer at a pre-determined temperature causes the thermoplastic resin to reform in a convex lens shape.

Various methods for producing microlens arrays, whether shaped, graded-index, or diffractive, are described in the article "Microlens Arrays" in Physics World July 1991, pages 27–32. Those skilled in the art will be familiar with the methods by which microlens arrays may be formed.

If a group of pixels is associated with each microlens (as will be discussed in the following), it will be possible to increase the size of each microlens to enable less expensive fabrication techniques. In this case, the shaped microlens array may be formed by known mould techniques. For example, a mould may be formed by creating indentations in a metal plate, and this mould may be used to make plastic lenses, either on a glass substrate or a plastic sheet.

If a microlens is associated with each pixel, it is acceptable to form an inverted image on the sensor array, but precise alignment is required between the microlenses and sensor pixels. If a group of pixels is associated with each microlens, then discontinuities occur at the boundary between one group and the next group when an inverted image is formed by each microlens. This problem is overcome by using a non-inverting system of microlenses. To form a non-inverting image, the optical path from the area to be imaged to the imaging plane comprises two or more refractory surfaces in series. This requires at least two lens arrays to be disposed along this optical path, and they may be formed either on opposite sides of a single substrate or sheet, or on two or more substrates or sheets. Thus, two or more microlens arrays are preferred, with lenses in each array being provided on the same optical axis as a corresponding lens in each other array.

In the example of FIG. 1, three lens arrays 20, 30, 40 together form a non-inverted image of the original to be recorded. An inverted image is formed by one array and this image is re-imaged by a subsequent array, to form a non-inverted image. The purpose of the central lens array is described below. For any particular spacing of the lens arrays, there is an associated required position of the object and of the image for focusing to take place, and for the object and image to be the same size. This will be evident to those skilled in the art. As a result, the spacing of the document to be imaged from the lens assembly, the spacing between the lens arrays, and the spacing of the image sensor plane from the lens assembly are each selected in combination to arrive at a practical implementation of the invention.

As described above, the lens elements 22, 32, 42 of each lens array 20, 30, 40 are preferably associated with a group of pixels, and the required non-inverting optical system is used. In the example shown in FIG. 1, individual lens elements 22A, 32A, 42A are shown to be associated with a group 12A of nine pixels 12. In practice, each microlens element may be associated with a much greater number of image sensor pixels, for example of the order of one hundred or more, so that the fabrication of the microlens array becomes less complicated. A typical pitch of 1 mm to 2 mm is provided for the microlens elements, and the resolution of the image sensing array 10 will then determine the number of image sensing pixels associated with an individual microlens from each array. The spacings that are desired between the lens arrays and the original and between the lens arrays and the image sensing array may also influence the required size of each lens element, because the size of each lens element dictates the possible ranges for the power and focal length.

The image sensor also has light emitting means associated with the lens array system. The arrangements of FIGS. 1 to 3 have light emitting portions disposed in or over the spacing between lens elements. In FIG. 1, the lens array 40 closest to the area to be imaged is provided with light emitting portions 46 which are positioned between the lens elements and provided on the substrate of the lens array 40. Alternatively, they may be provided on a separate substrate immediately adjacent the lens array 40. In either case, the light emitting portions are provided between the light paths associated with the lens elements, so that they do not block the desired passage of light through the lens elements.

The light emitting portions 46 may be discrete lamps such as light emitting diodes (LEDs) or they may be electroluminescent lamps or some other light sources. If they are electroluminescent lamps, they may be of the same colour and occupy the whole area between the lens elements 32, or preferably they may be in strips of different colours as shown in FIG. 1.

The light emitting portions 46 of FIG. 1 comprise strips of electroluminescent material which are produced by depositing a conducting electrode on the substrate of the lens array 40, then depositing a phosphor layer over the conducting electrode and a transparent electrode over the phosphor layer. Electrical connections are provided for the strips along lateral edges of the lens arrangement.

Figure 2:
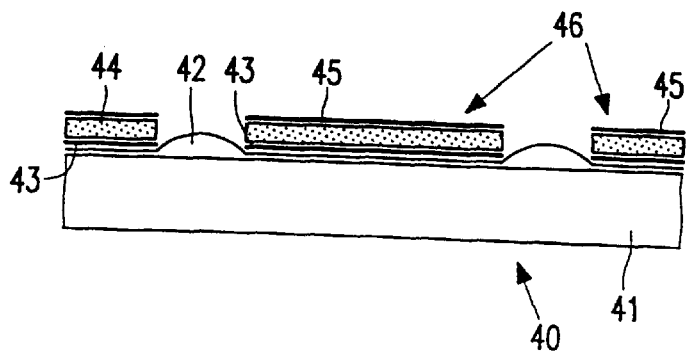
FIG. 2 shows one possible arrangement of the light emitting means of the image sensor.

FIG. 2 shows the microlens array 40 in greater detail, and represents a first arrangement of the light emitting portions 46, in which the portions 46 comprise electroluminescent lamps deposited on the substrate 41, for example a glass substrate, of the microlens array 40. The lamps comprise a first, opaque electrode 43 adjacent the substrate, a phosphor layer 44 provided over the first electrode 43, and a second, transparent electrode 45 provided over the phosphor layer 44. The portions 46 are provided in the spacing between lens elements 42.

Figure 3:
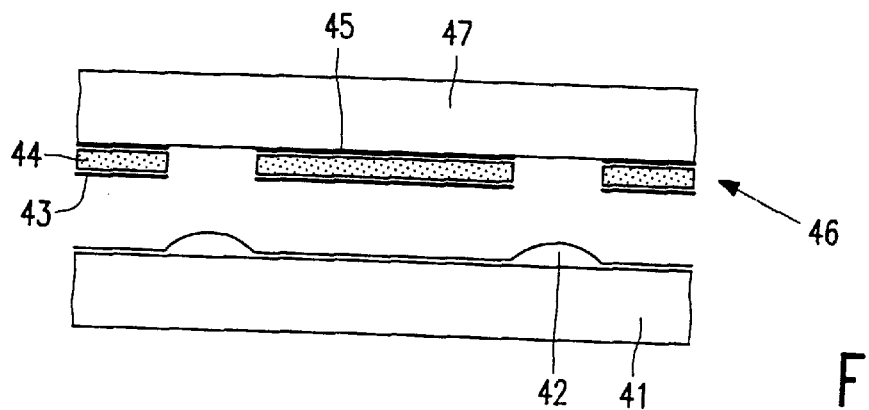
FIG. 3 shows a first alternative arrangement of the light emitting means of the image sensor.

FIG. 3 shows an alternative arrangement for the light emitting portions, in which the portions 46 are provided on a separate, preferably glass or plastic, substrate 47, with electrodes 43,45 and a phosphor layer 44 corresponding to the layers represented in FIG. 2. In this case, the portions 46 are positioned over the spacing between lens elements, but again do not block the passage of light from the desired areas of the area to be imaged to the lens elements 42. Depending upon the orientation of the microlens arrays, the light emitting portions may be required to transmit light through their respective substrate, or away from this substrate. This is achieved by appropriate selection of transparent and opaque electrodes. For example, in FIG. 3, the electrode adjacent the substrate 47 will be the transparent electrode. The passage of light through the substrate 47 before reaching the original may also increase the spreading of light before illumination of the original.

The light emitting means may alternatively comprise one or more light sources (or three sets of one or more coloured light sources) disposed around the periphery of the lens array system, and the light emitting means may then additionally comprise light deflecting portions disposed in or over the spacing between lens elements.

Figure 4:
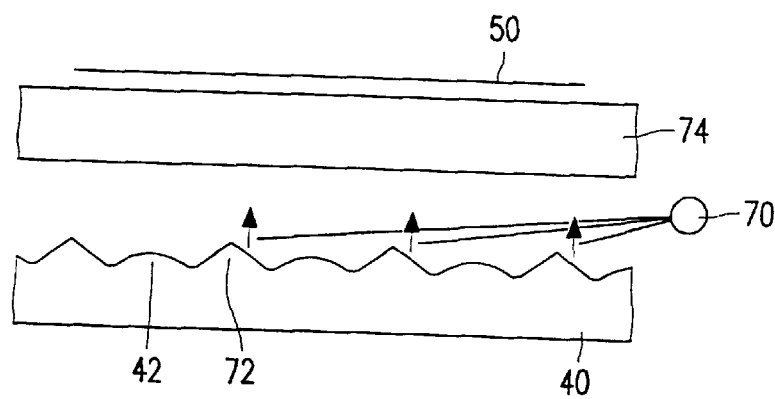
FIG. 4 shows a second alternative arrangement of the light emitting means of the image sensor.

FIG. 4 shows a first arrangement of this type in which the deflecting portions comprise reflective prisms 72 disposed between lens elements 42 of the microlens array 40. These prisms 72 are positioned outside the light envelopes associated with the microlenses, and thereby do not adversely affect the image sensing operation. The prisms 72 may have a rough light reflective surface to increase scattering, so as to produce uniform illumination of the document. The size and shape of the prisms, and the degree of roughness may vary across the lens array, to achieve uniform illumination of the document. The shape of the prisms will also be selected according to the lighting requirements, and the prisms may have any number of faces, regular or irregular, or may even comprise portions of a sphere, with a radius of curvature and height varying across the microlens array. Each prism 72 may additionally be raised above the microlens array substrate, so that the prisms 72 are disposed in a plane above the lens elements 42. In this way, the lens elements may each be in the shadow of an adjacent prism 72, so that light from the peripheral light source 70 cannot enter the lens element 41.

The prisms 72 may be moulded during the same process used to form the associated lens array as described above.

Figure 5:
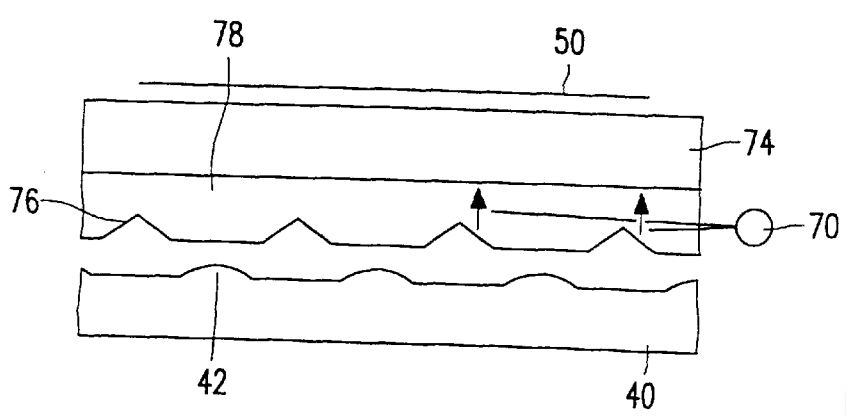
FIG. 5 shows a third alternative arrangement of the light emitting means of the image sensor.

FIG. 5 shows an alternative arrangement, in which the reflective prisms are formed on a different substrate to the substrate of the lens array 40. The prisms may, for example, be formed as indentations in a window 74, provided between the lens arrangement and the document 50, and provided for accurately locating the document at the correct position with respect to the lens arrangement. These indentations could be cut or moulded into the window 74 or could be applied as a separate layer or film 78, as shown in FIG. 5. Again, the shape of the indentations 76 will be selected according to the desired reflection response of light from the peripheral light source 70. The reflective indentations 76 are provided over the spacing between the lens elements with clear portions of the window 74 or the layer 78 being disposed over the lens elements 42.

In order to obtain colour images, separate light sources of each colour are provided, and only one colour is switched on at any one time. Ideally, the prisms or indentations should provide a uniform image of the light source on the document. For this purpose, the layer 78 in the example of FIG. 5 may comprise a diffractive material to provide a spread of reflected light from the light source 70 onto the document 50. The layer 78 may be provided with regions of different diffractive properties corresponding to the wavelengths of the different light sources required for colour imaging. As a further example, the scattering film 78 may comprise a holographic structure for scattering or imaging the light from the lamp over the document, or may comprise a block with markers provided on one face (in positions corresponding to the spacing between the lens elements) which interrupt total internal reflection within the block and scatter light towards the original.

An advantage of the reflecting indentations being provided in the window 74, or directly adjacent the window 74, is that reflections towards the sensor off the back of the window can be avoided. Reflections towards the sensor from the front of the window should also be avoided, and an anti-reflection coating on the outside of the window 74 may be provided for this purpose.

A reflective coating may be provided on the angled faces of the prisms or indentations to provide the deflection of light from the peripheral light sources. However, it is preferred that the prisms are simply moulded from a clear sheet, or the indentations from part of a clear window, so that the amount of scattering is a function of the angles of the prism or indentation structure. The indentations may produce this scattering by interrupting total internal reflection within the window. When there is no reflective coating, the base of each indentation or prism preferably has a reflective and/or light blocking layer to prevent light passing through the indentations or prisms to the sensor.

The peripheral lamps shown in the examples of FIGS. 4 and 5 may be of many different types. For example, cold-cathode fluorescent lamps (CCFL) or LED lamps may be appropriate. It may be possible to provide a single lamp for each colour, or alternatively a number of lamps of each desired colour may be provided around the periphery of the lens arrangement.

It is also possible to combine light sources of the type described with reference to FIGS. 1 to 3 with light sources of the type described with reference to FIGS. 4 and 5. In particular, the brightness of currently available red electroluminescent lamps is relatively weak compared to the brightness of equivalent green and blue lamps. However, red light emitting diodes do provide the required level of brightness.

Figure 6:
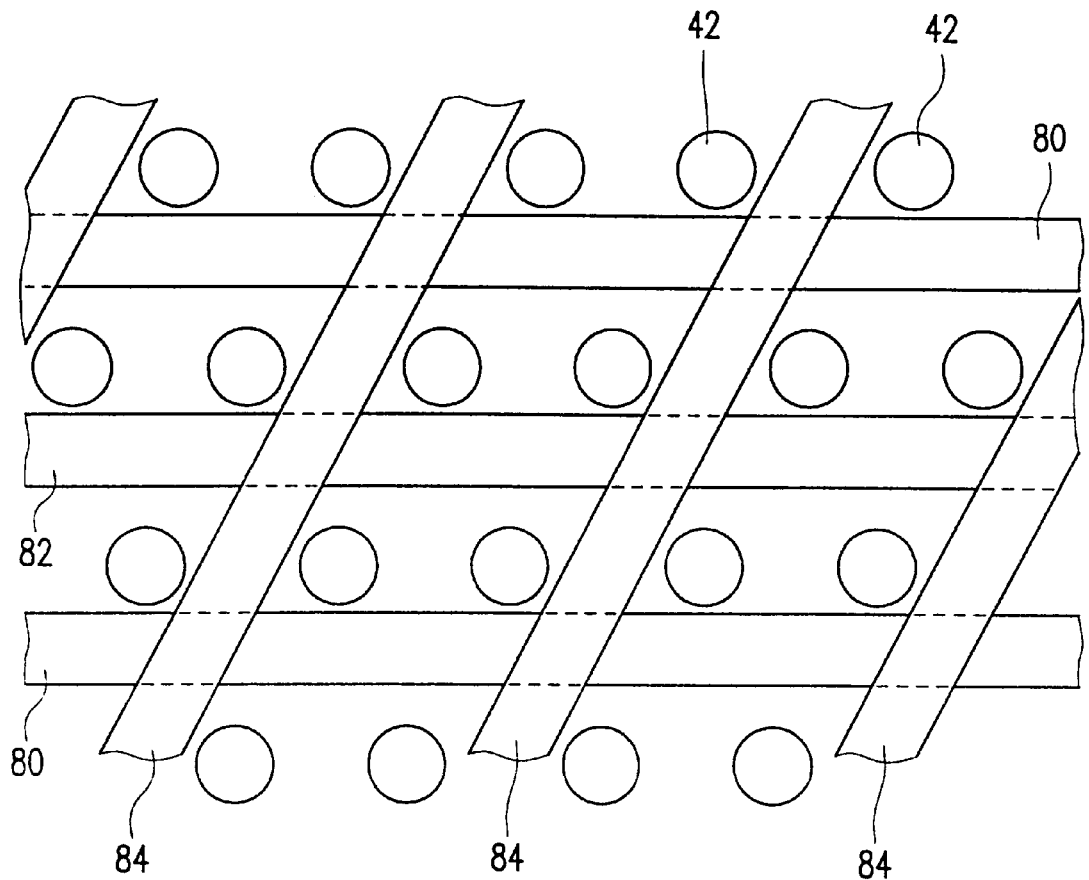
FIG. 6 shows a fourth alternative arrangement of the light emitting means of the image sensor.

FIG. 6 shows one possible implementation of a colour lighting arrangement having green and blue electroluminescent strips and having a reflecting and scattering medium for light introduced by a red LED lamp or lamps arranged at the periphery of the lens arrangement.

Green and blue electroluminescent strips 80, 82 are provided between the lens elements 42 as in the embodiment of FIGS. 1 to 3. In the example shown in FIG. 6, the reflective portions are arranged in strips 84 which are offset from the axes of the electroluminescent strips by 60°, the lens elements 42 being arranged in a hexagonal honeycomb grid. The strips 84 of reflective portions are provided over the lens array 40 and over the electroluminescent green and blue strips, so that some of the light emitted by the green and blue strips 80, 82 will pass through the light reflecting/scattering strips 84. It is not considered that this local scattering will cause illumination problems, and could even improve the uniformity of the illumination from the electroluminescent lamp.

As an alternative to the arrangement shown in FIG. 6, reflective or scattering strips 84 could be arranged in parallel with the strips of electroluminescent material, and could then simply replace the position occupied by the red strips shown in the example of FIG. 1. As a further alternative, the strips 80, 82 of electroluminescent material could be disposed at 60° to the horizontal or vertical axes of the image sensor array, and the reflective/scattering strips could then extend fully from one edge of the image sensor to the opposite edge (either horizontally or vertically). This simplifies the light source arrangement, because each strip of reflective or scattering material has the same light source requirement.

It may also be desirable to introduce both the red and green light from peripheral light sources. In this case, the same scattering areas could be used by both light sources, and a single colour electroluminescent light source would be required. This light source could then take any appropriate form and would not need to be arranged in strips.

As the colours are switched on one at a time for colour imaging, the scattering medium could be a switchable medium such as polymer dispersed liquid crystal (PDLC). Such a material can be arranged to be substantially optically clear when the electroluminescent lamp is switched on to prevent the local scattering of light from the electroluminescent strips, described above. Alternatively, diffractive elements could be used for scattering light from the peripheral light sources. Such diffractive elements can be designed to be responsive only to a specific wavelength of light, and can therefore be arranged to be substantially transparent to other colours. In this way, the diffractive elements would not interfere with the light from the electroluminescent strips.

Figure 7:
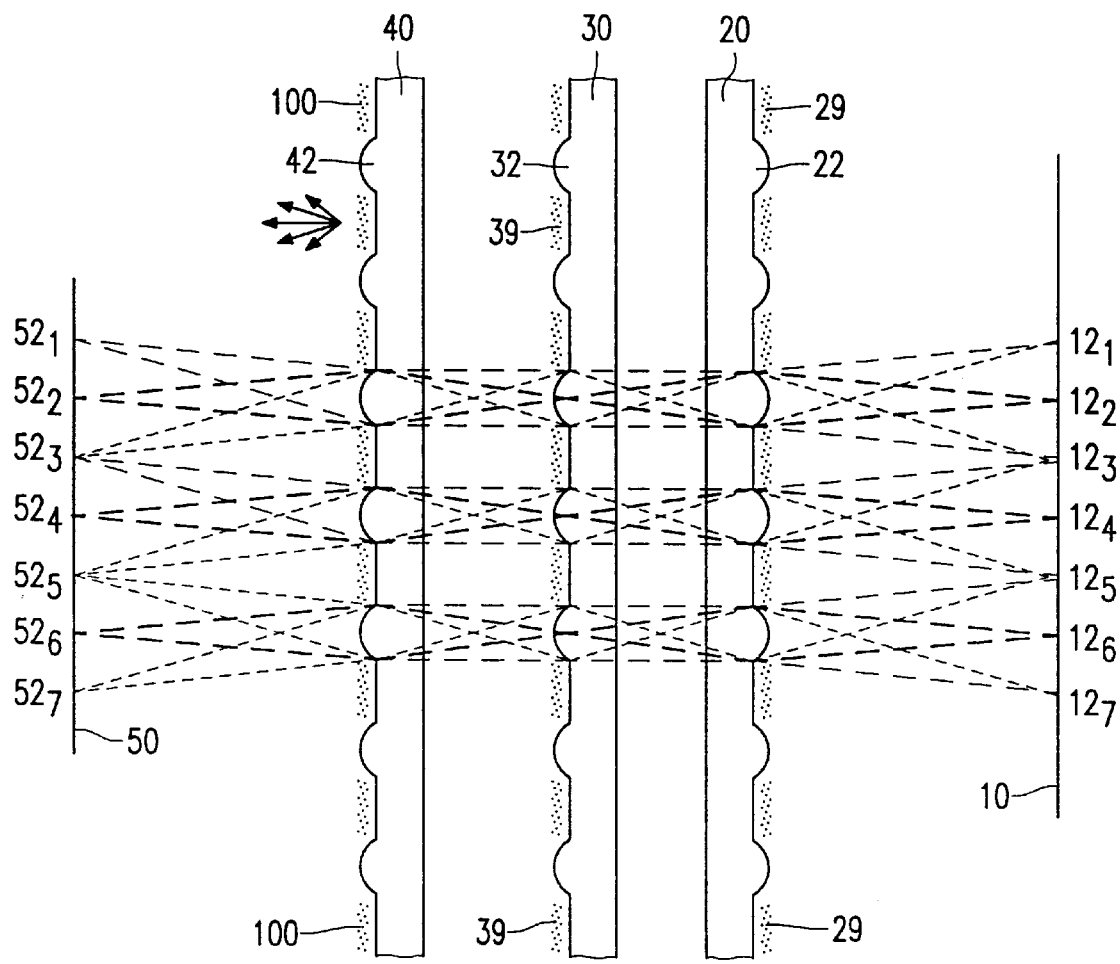
FIG. 7 shows in greater detail one possible optical arrangement for the image sensor of the invention.

FIG. 7 will be used to explain the operation of the optical lens arrangement described with reference to FIG. 1.

For the purposes of explanation, the image sensing array 10 is represented as a plane, and as explained previously, this plane represents a surface of any appropriate image capturing system on to which the image is to be focused. The imaging sensing device may comprise a linear array of pixels, for example a linear array of charge coupled devices as commonly used in facsimile machines, or may comprise a two dimensional array. The approximate positions of seven pixels $12_1$ to $12_7$ have been represented in FIG. 4. The area to be imaged has also been represented by a plane 50, and this may represent a tablet or window on to which a document to be copied is positioned. For the purposes of explanation, the area has been divided into seven discrete areas $52_1$ to $52_7$, which are taken to correspond in size to the size of the pixels of the imaging array 10.

In the example shown in FIG. 7, each lens element 22, 32, 42 is shown receiving signals from three adjacent areas of the document to be imaged. Of course, in two dimensions, each lens element will thus be associated with nine pixels, in the 3×3 sub-array of FIG. 1. As described above, each lens element may in fact be associated with a much greater number of pixels. Although described as a square, the sub-array of pixels could be rectangular, hexagonal or some other shape.

During operation of the image sensor, each lens element 42 closest to the area to be imaged receives light from three aligned areas, for example $52_1$, $52_2$, $52_3$, in FIG. 4. The lens array 40 of lens elements 42 forms an inverted image of these areas close to lens array 30. Each lens element 22 in the lens array 20 then forms a non-inverted image on the sensing plane of the image sensing array 10. The purpose of the lens element 32 in the lens array 30 is to prevent light spreading. If the lens array 30 were omitted, light from the lens elements 42 could reach several of the lens elements 22.

In the example shown, lens elements 32 image the lens elements 42 on to lens elements 22, so that substantially all the useful light received by any one of lens elements 42 is transmitted to the corresponding lens element 22. Other lens arrangements will be apparent to those skilled in the art.

Illuminating areas 100 have been shown associated with the lens array closest to the document to be imaged. These illuminating areas may be considered to be the strips of FIGS. 1 to 3, or the reflective portions of FIGS. 4 and 5, or the combination of these. Of course, the illuminating areas may be associated with a different lens array. The illuminating light must then pass through at least one lens array before illuminating the original, and this may increase the spreading of light, improving the uniformity of illumination of the original.

The lens arrays 20, 30, 40 are shown on separate substrates. It will be apparent that arrays 20 and 30 could be formed on opposite sides of a single substrate of appropriate thickness. Alternatively, by reversing array 30, arrays 30 and 40 could be formed on a single substrate.

Figure 8:
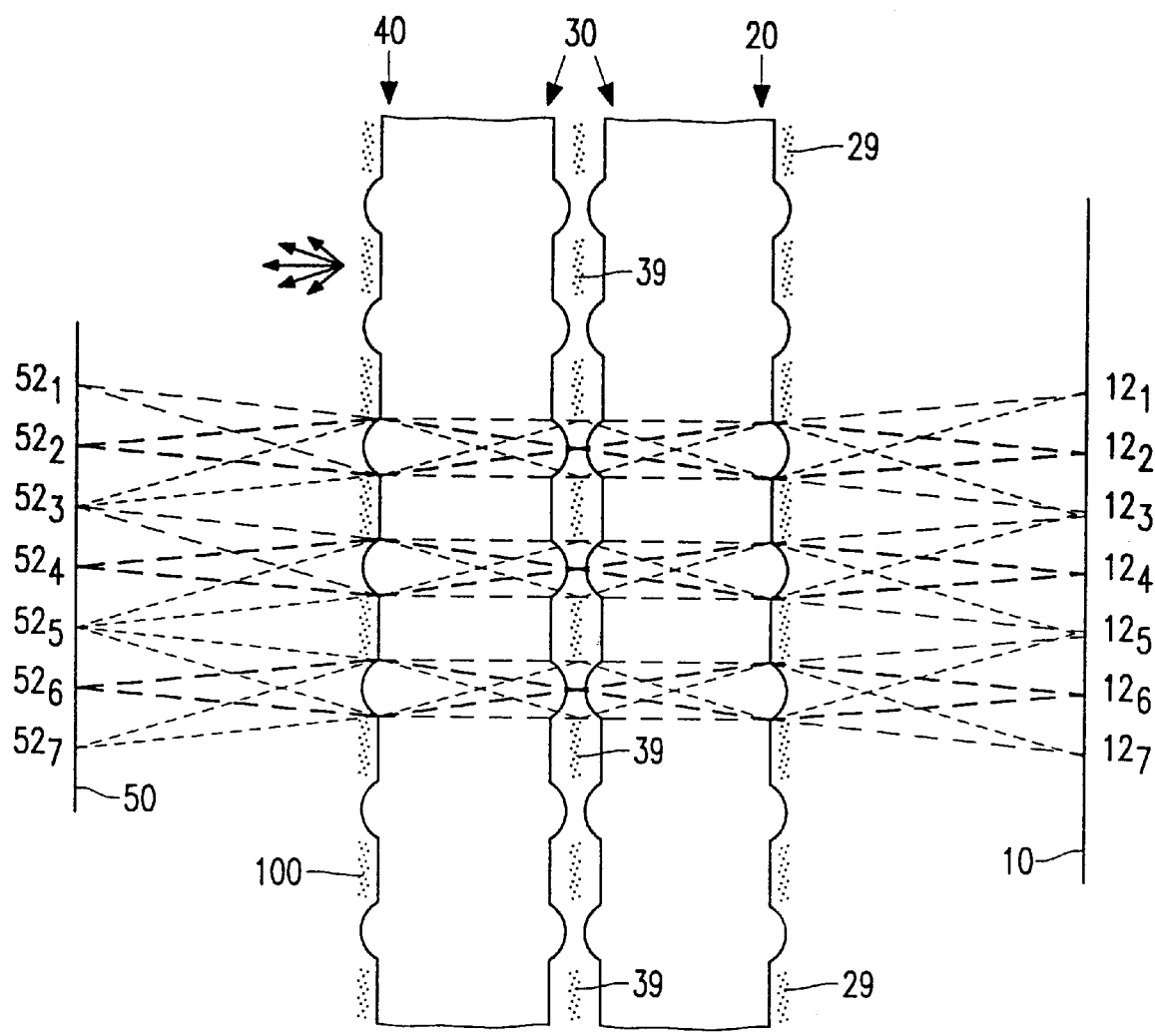
FIG. 8 shows a first alternative optical arrangement.

Yet another alternative is for the power in the lens array 30 to be divided between two arrays, each of which is then formed on the other side of either array 20 or array 40, as shown in FIG. 8.

Although in FIGS. 7 and 8 the distance from the area to be imaged to the lens array 40 is shown approximately equal to the distance between the lens array 20 and the image sensing array, this is not a necessary condition. It is only necessary for the non-inverted image to be the same size as the object being copied.

Figure 9:
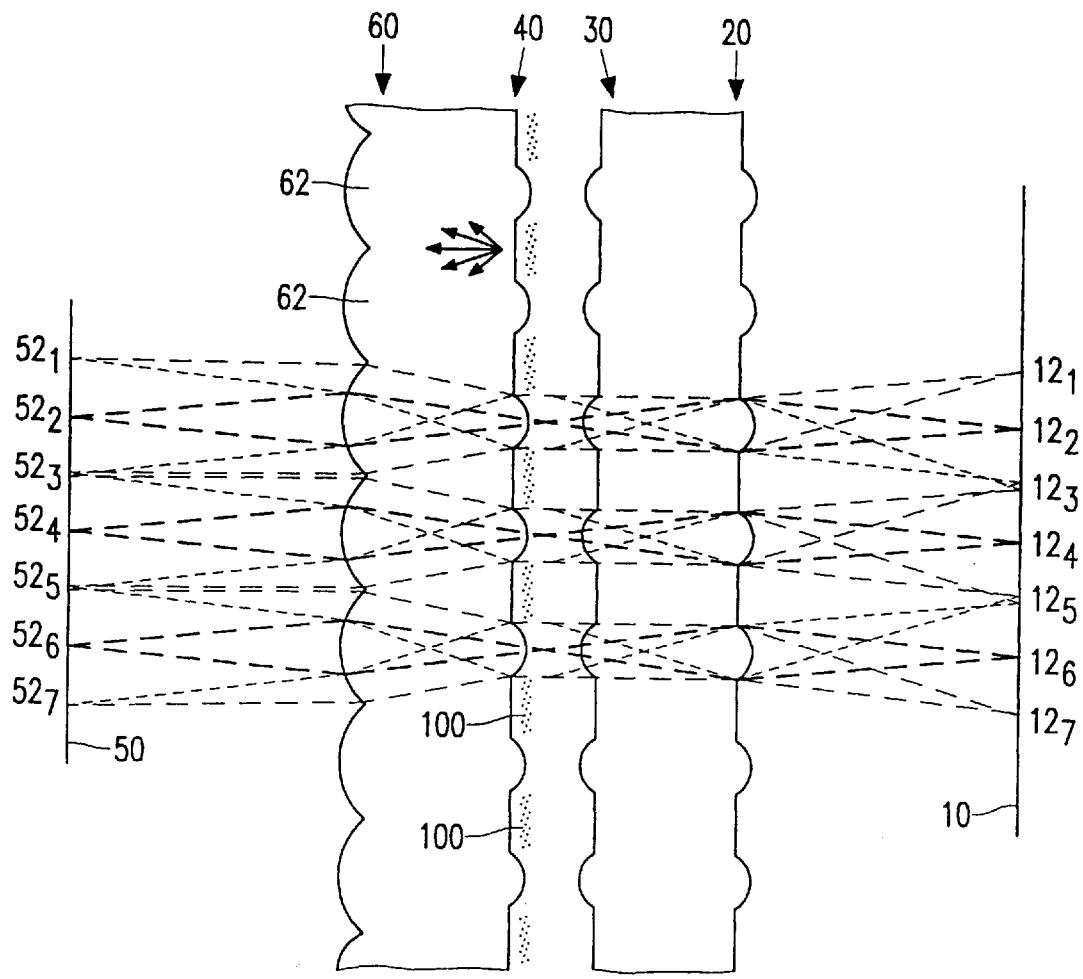
FIG. 9 shows a second alternative optical arrangement.

Another alternative, shown in FIG. 9, utilises an additional microlens array 60 between the area to be imaged and lens array 40. The purpose of the lenses 62 in this array is to bend the off-axis rays from object points such as $52_1$, $52_2$, $52_3$ etc., so that they are closely parallel to the optical axis. If the document being copied is then slightly out of focus, the error in its apparent position will be minimised.

Although shown as convex moulded lenses in FIGS. 7 to 9, the microlens arrays could be other forms of planar lens arrays such as graded index lenses made by ion diffusion, or Fresnel lenses, or holographic or diffractive lenses.

Another alternative is to use an array of graded index rod lenses instead of conventional lenses. In this case, only one array need be used to obtain a non-inverted image, as graded index rod lenses can perform the function of lenses 22, 32, 42. The light emitting portions would then be placed in spaces between the rod lenses. A two dimensional array of rod lenses is, however, more expensive to manufacture than conventional microlenses.

To enable the reception of signals from the required areas and to prevent light reaching the respective image sensing elements from a wider field of view, blocking arrangements may be required, such as arrays of absorbing material 29, 39 with apertures (shown in FIGS. 7 to 9), or other light channelling arrangements. The illuminating areas 100, whether electroluminescent strips or reflectors on a light blocking base, may function as light blocks for light travelling towards the spacing between lenses 42 in the lens array 40 of FIGS. 4 to 6. Possibilities for ensuring that each image sensing element receives light only from the desired areas of the document to be imaged will be appreciated by those skilled in the art.

The lens arrays 20, 30, 40 or 20, 30, 40, 60 together act as a non-inverting system having unity magnification. It is possible, however, to utilise a single lens array provided with the light emitting portions, but such an arrangement will provide an inverted image of the document to be imaged. As discussed above, if each microlens element is associated with only one pixel, this does not cause any difficulty, but when each lens element is associated with a sub-array of pixels, which is preferred, then local inversion of portions of the document to be imaged occurs. This gives rise to the need for signal processing of the image received and also requires a knowledge of which pixels are associated with each lens element. Consequently, the positioning of the lens array is in this case very critical, and the use of a non-inverting lens arrangement as described above is preferred.

The non-inverting lens arrangement of FIGS. 7 to 9 gives a spacing of the area to be imaged 50 from lens array 40 or 60. In all examples, the window 74, shown only in FIGS. 4 and 5, may be inserted between the area to be imaged 50 and the lens array 40 or 60 closest to this area to protect the lens arrangement and to form a locating surface for a document to be imaged. Other arrangements are possible as will be appreciated by those skilled in the art.

Typically, the spacing of the area to be imaged 50 and of the image sensing array 10 from the respective nearest part of the lens arrangement is selected to be of the order of 2 to 4 mm, and this dictates the relationship between the focal length of each microlens element 22, 32, 42 and the spacing of the microlens arrays (since an inverted focused image must be formed between the lens arrays 20, 40). To avoid overlapping of the intermediate inverted image with inverted images from adjacent lens elements, the size of the inverted image must be smaller than the original object. A reduction to one half of the original allows adequate blocking by absorbing material 39

The distance of 2 to 4 mm is chosen because this provides sufficient space for the light from the illuminating areas 100 to spread uniformly over the area to be imaged 50. This spacing is also governed by the depth of focus to be achieved. Typically, a depth of focus of 1 to 2 mm is adequate to enable documents which are not perfectly flat to be successfully imaged.

The dimensions given above may give rise to lens elements having a diameter of 0.25 to 1 mm. If the lens elements in any one array are arranged with a pitch of 1 to 2 mm (so that the dimension of an area of the document to be imaged by an individual lens element is 1 to 2 mm) then strips of light emitting material of width 0.5 to 1 mm are possible between lenses. If a sub-array of approximately 30 by 30 pixels of the image sensing array 10 is associated with each lens element, a resolution suitable for document scanning applications may be obtained. For example, to achieve 600 dpi (dots per inch) a pixel pitch of approximately 42 micrometers is required.

The 2 to 4 mm spacing between the document to be imaged and the lens array 40 also enables sufficiently uniform illumination of the document to be produced by operating only one in three of the light sources, because spreading occurs in the spacing between the lens arrangement and the document. This enables the various colour imaging systems described above to be implemented.

From reading the present disclosure, other modifications will be apparent to persons skilled in the art. Such modifications may involve other features which are already known in the design and use of electrical or electronic circuits and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation of one or more of those features which would be obvious to persons skilled in the art, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. An image sensor comprising an image capturing device for capturing an image on an imaging plane of the device, and a lens arrangement, the lens arrangement being positioned between an area to be imaged and the imaging plane, the lens arrangement comprising one or more arrays of spaced apart lens elements each for transmitting light from a portion of the area to be imaged to a portion of the imaging plane, the image sensor further comprising light emitting means disposed between the area to be imaged and the imaging plane and for illuminating the area to be imaged, the light emitting means being disposed in or over the spacing between the lens elements.

2. An image sensor as claimed in claim 1, wherein the lens elements comprise microlenses.

3. An image sensor as claimed in claim 2, wherein the lens arrangement comprises at least two microlens arrays, each microlens in one array having substantially the same optical axis as a corresponding microlens in each other array.

4. An image sensor as claimed in claim 3, wherein the lens arrangement forms a non-inverted image of the area to be imaged on the imaging plane.

5. An image sensor as claimed in claim 1, wherein the image capturing device comprises a plurality of image sensing pixels, each lens element being associated with a sub-array of pixels.

6. An image sensor as claimed in claim 5, wherein each pixel comprises a photodiode.

7. An image sensor as claimed in claim 1, wherein the light emitting means comprises light emitting portions, the area to be imaged being spaced from the lens arrangement so as to enable illumination of the area to be imaged by a proportion of the light emitting portions.

8. An image sensor as claimed in claim 7, wherein each light emitting portion is selected from the group comprising red, green and blue light sources.

9. An image sensor as claimed in claim 8, wherein the light sources comprise strips of electroluminescent light emitting material extending between the lens elements in one array, and arranged in a repeating sequence of red, green and blue light sources.

10. An image sensor as claimed in claim 1, wherein the light emitting means comprises a light source arranged at a peripheral edge of the lens arrangement, and light deflecting portions arranged in or over the spacing between lens elements.

11. An image sensor as claimed in claim 10, wherein the light deflecting positions comprise reflecting or diffracting elements.

12. The sensor of claim 1 wherein the lens arrangement is an imaging lens arrangement.

13. The sensor of claim 1 wherein each lens images as well as transmits.

* * * * *